United States Patent [19]
Neil

[11] Patent Number: 5,930,501
[45] Date of Patent: Jul. 27, 1999

[54] PICTORIAL USER INTERFACE FOR ESTABLISHING TIME OF DAY AND GEOGRAPHICAL OR ENVIRONMENTAL CONTEXT ON A COMPUTER DISPLAY OR OTHER MONITOR

[76] Inventor: John M. Neil, 330 Townsend St. Suite 237, San Francisco, Calif. 94107

[21] Appl. No.: 08/934,293

[22] Filed: Sep. 19, 1997

Related U.S. Application Data

[60] Provisional application No. 60/026,477, Sep. 20, 1996.

[51] Int. Cl.⁶ .............................. G06F 1/14; G06F 3/14
[52] U.S. Cl. .......................................... 395/551; 345/334
[58] Field of Search ............................ 395/551; 345/302, 345/475, 333, 334; 707/526, 530

[56] References Cited

U.S. PATENT DOCUMENTS

| | | | |
|---|---|---|---|
| 5,758,093 | 5/1998 | Boezeman et al. | 345/303 X |
| 5,777,612 | 7/1998 | Kataoka | 345/302 |
| 5,793,364 | 8/1998 | Bolanos et al. | 345/302 X |

*Primary Examiner*—Thomas M. Heckler
*Attorney, Agent, or Firm*—William C. Milks, III

[57] ABSTRACT

A system for retrieving and displaying a pictorial user interface on a computer display or other monitor whereby a series of time-lapse pictorial images change, over time, under software control such that the time of day and changes thereof can be visualized both for a user's geographical location or environment, as well as for the geographical location or environment of another person, such as a party telephoning the user from a different geographical location or environment in a different time zone.

27 Claims, 21 Drawing Sheets

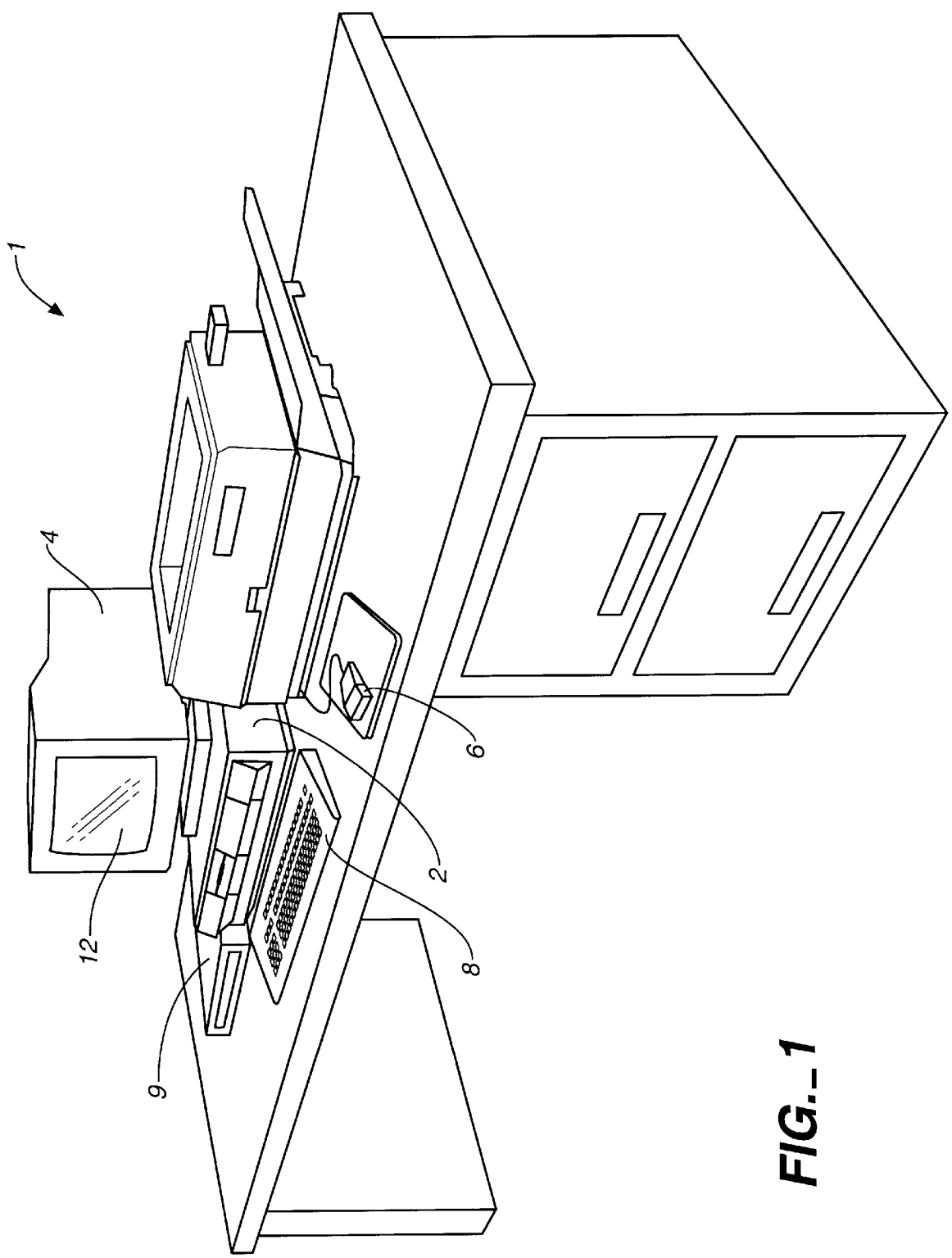
FIG._1

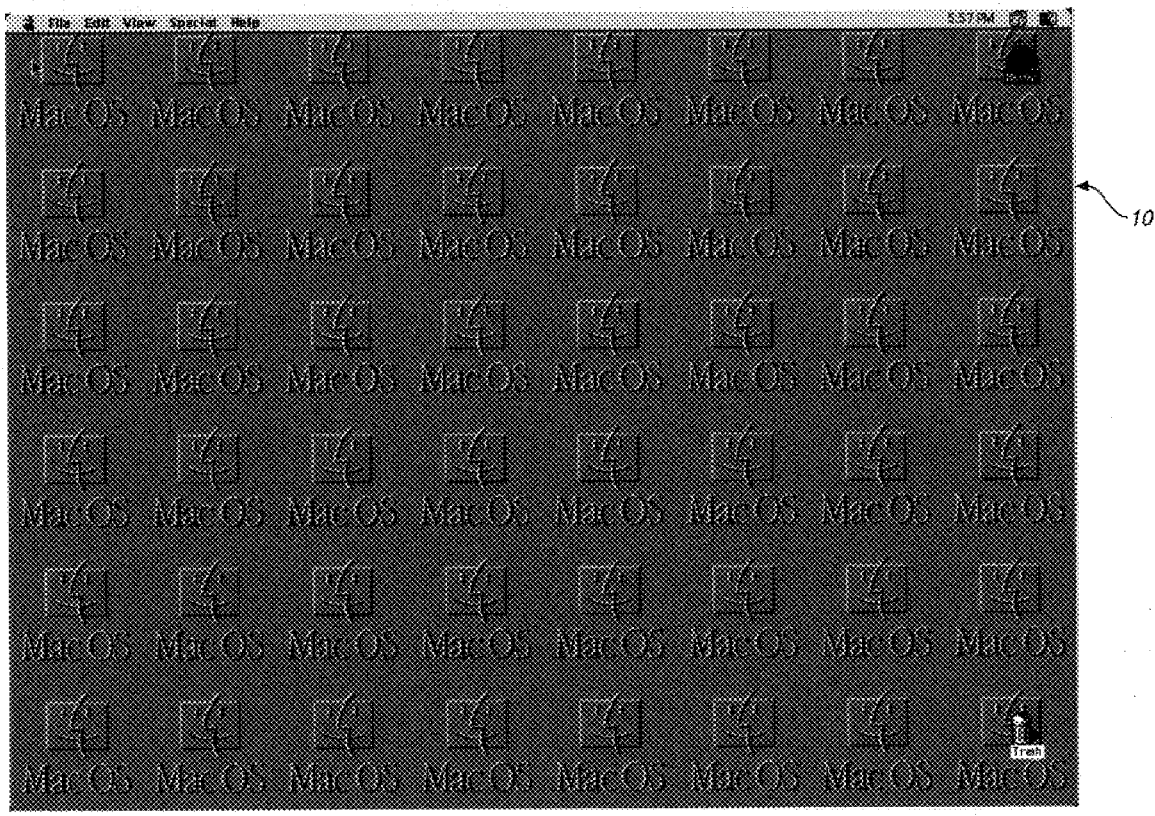
FIG._2 (PRIOR ART)

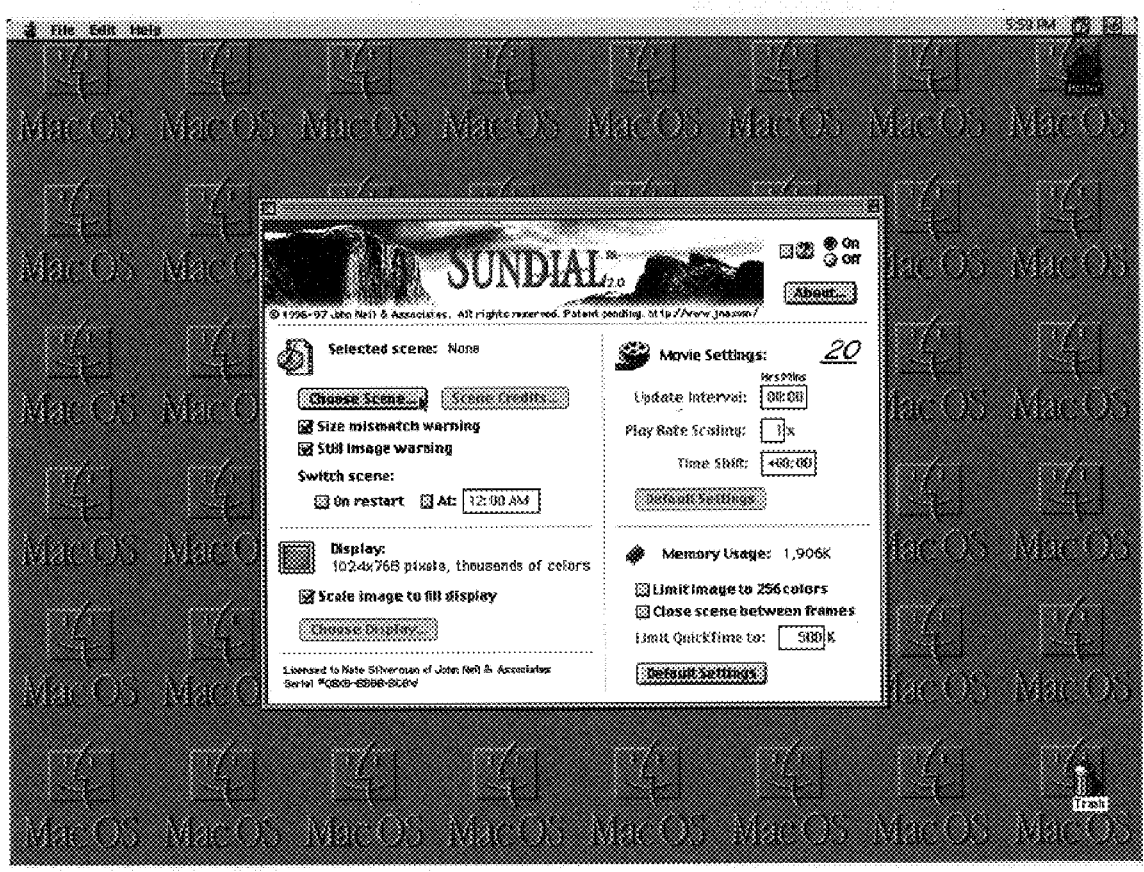
FIG._3A

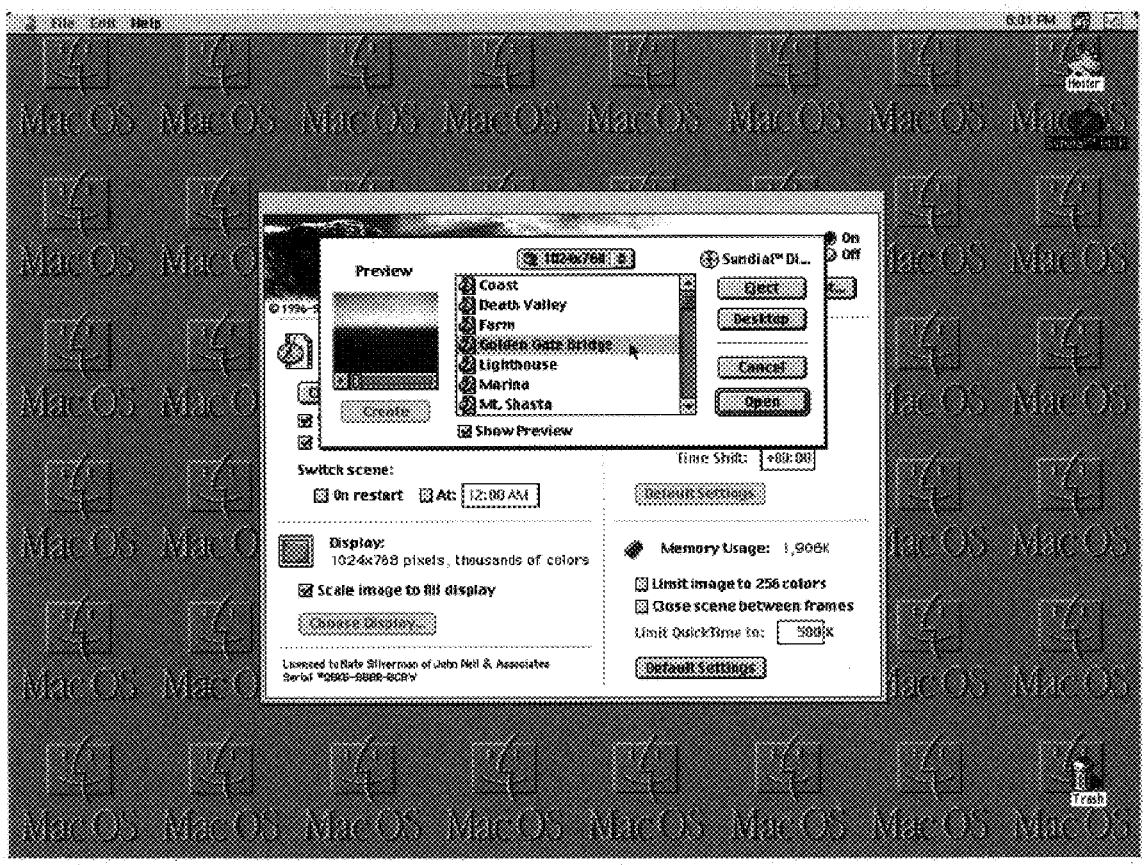
FIG._3B

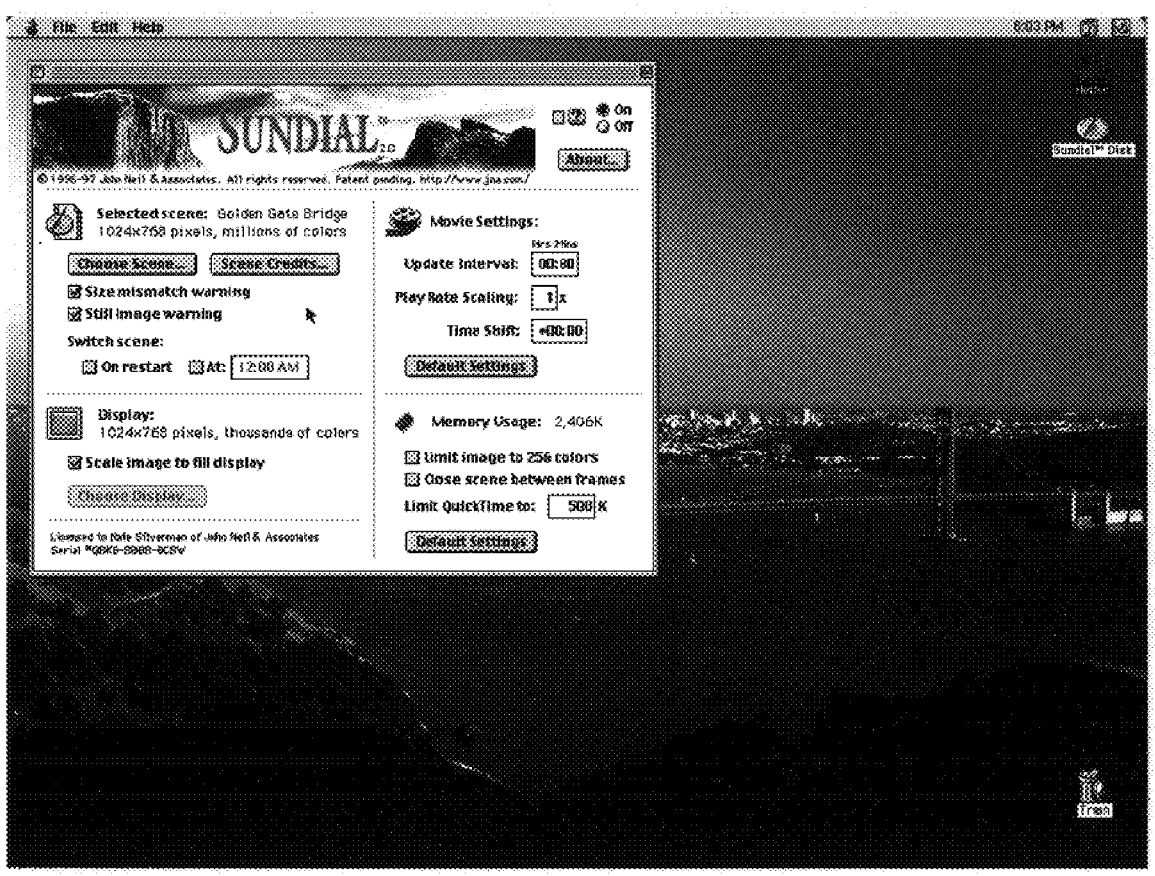
FIG._3C

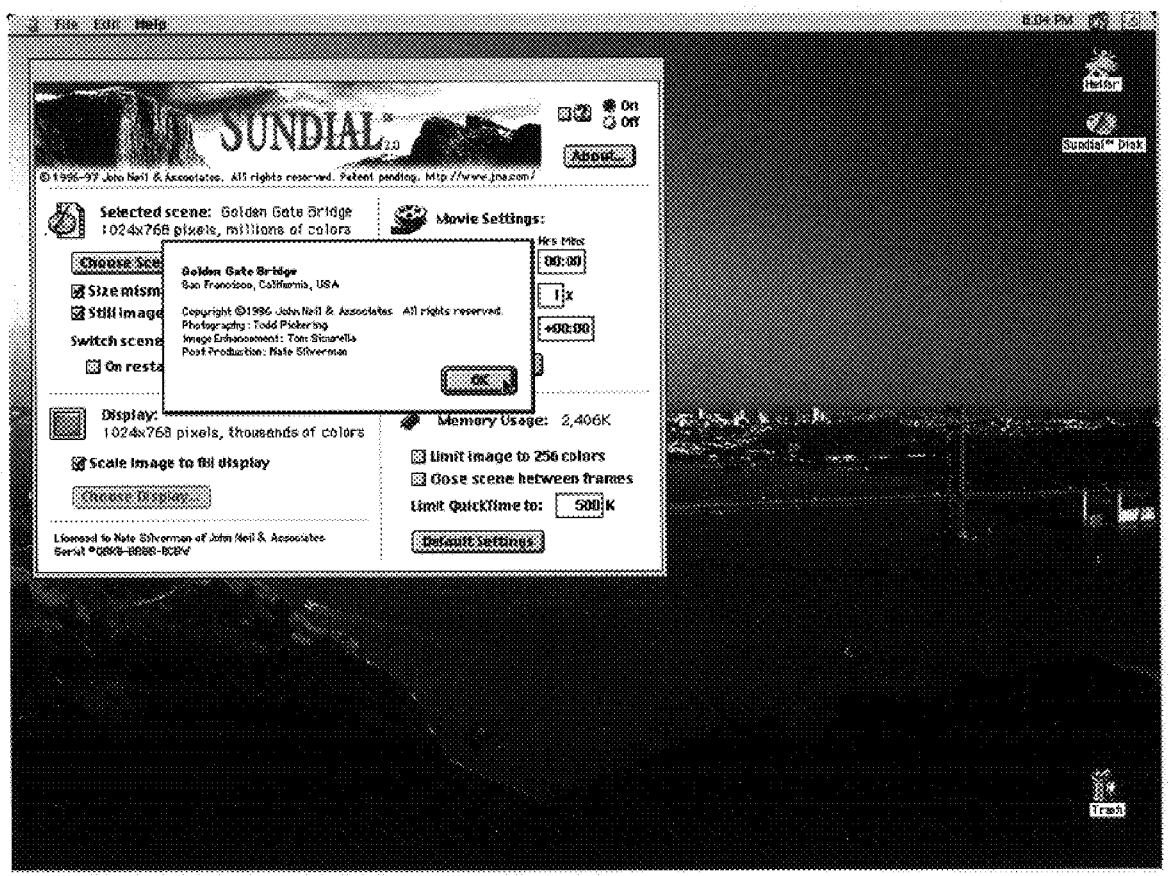
FIG._3D

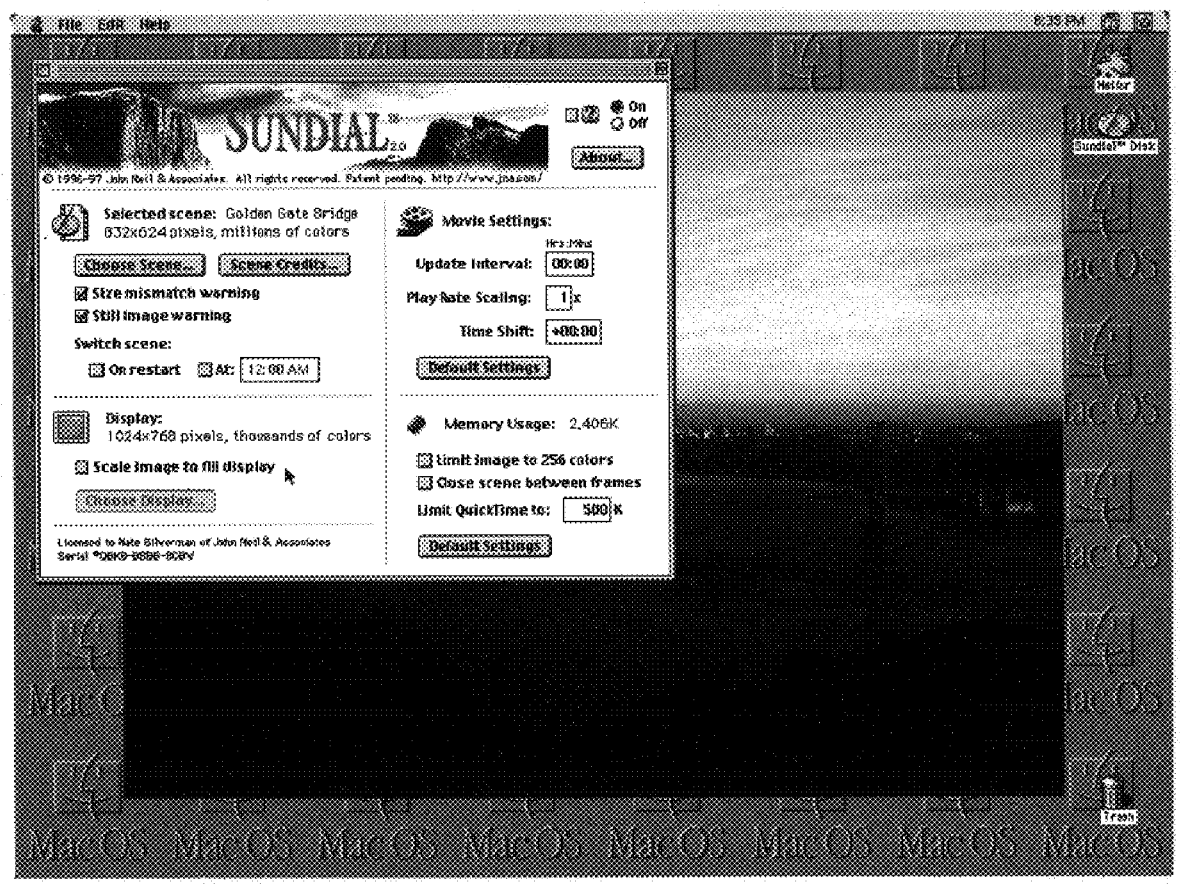
FIG._3E

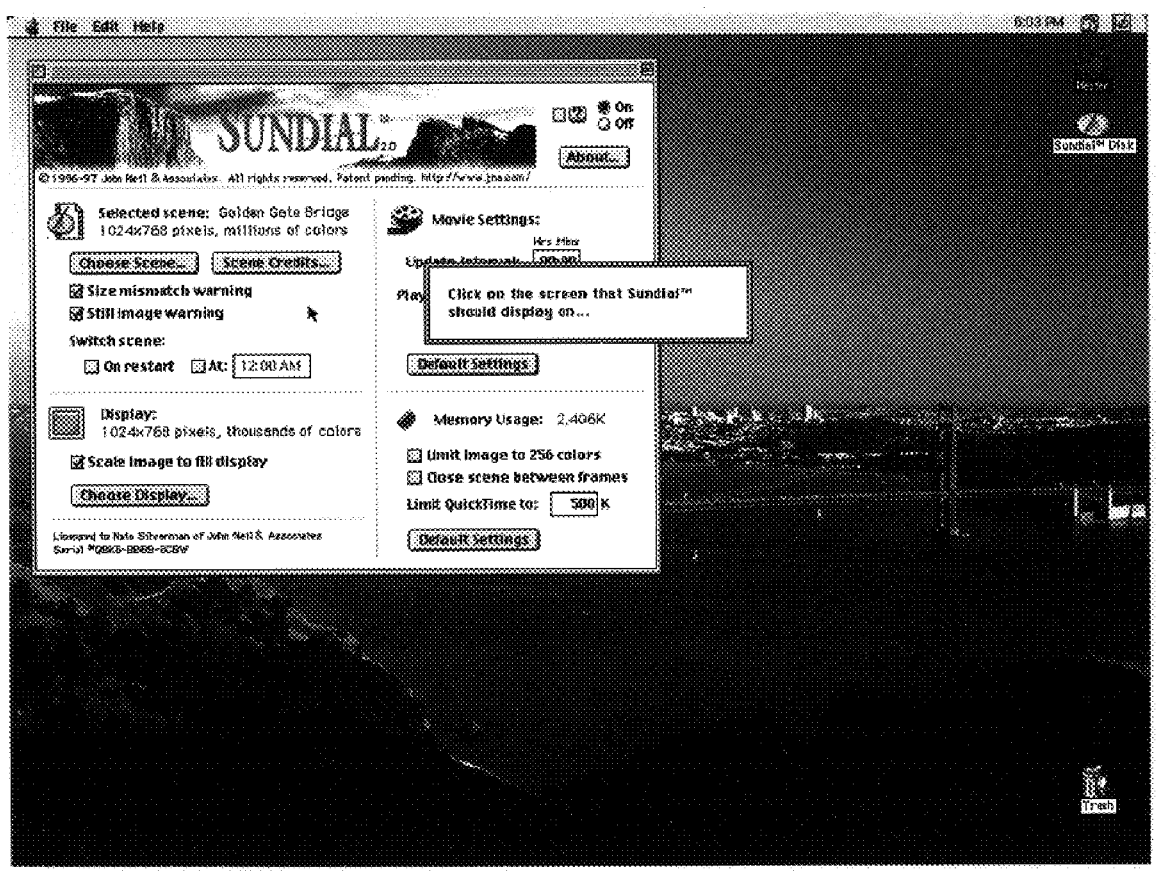
FIG._3F

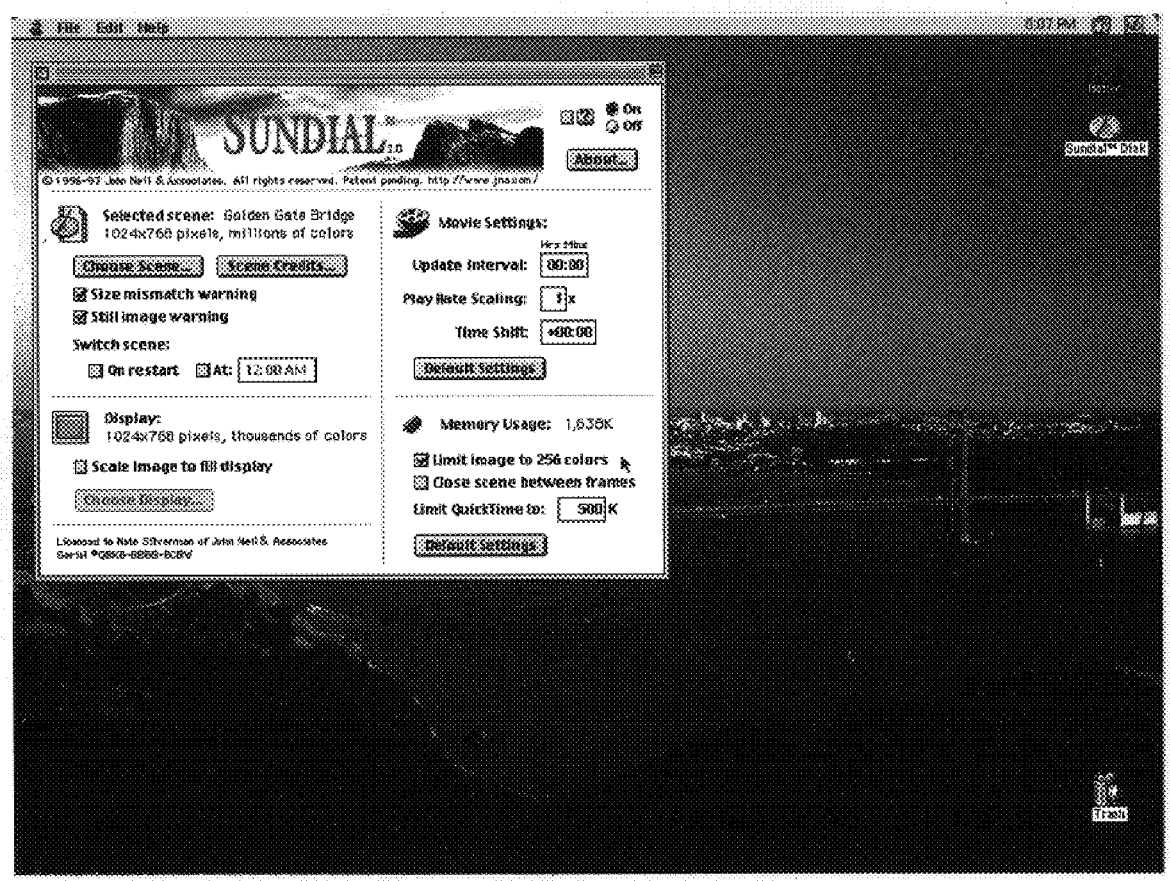
FIG._3G

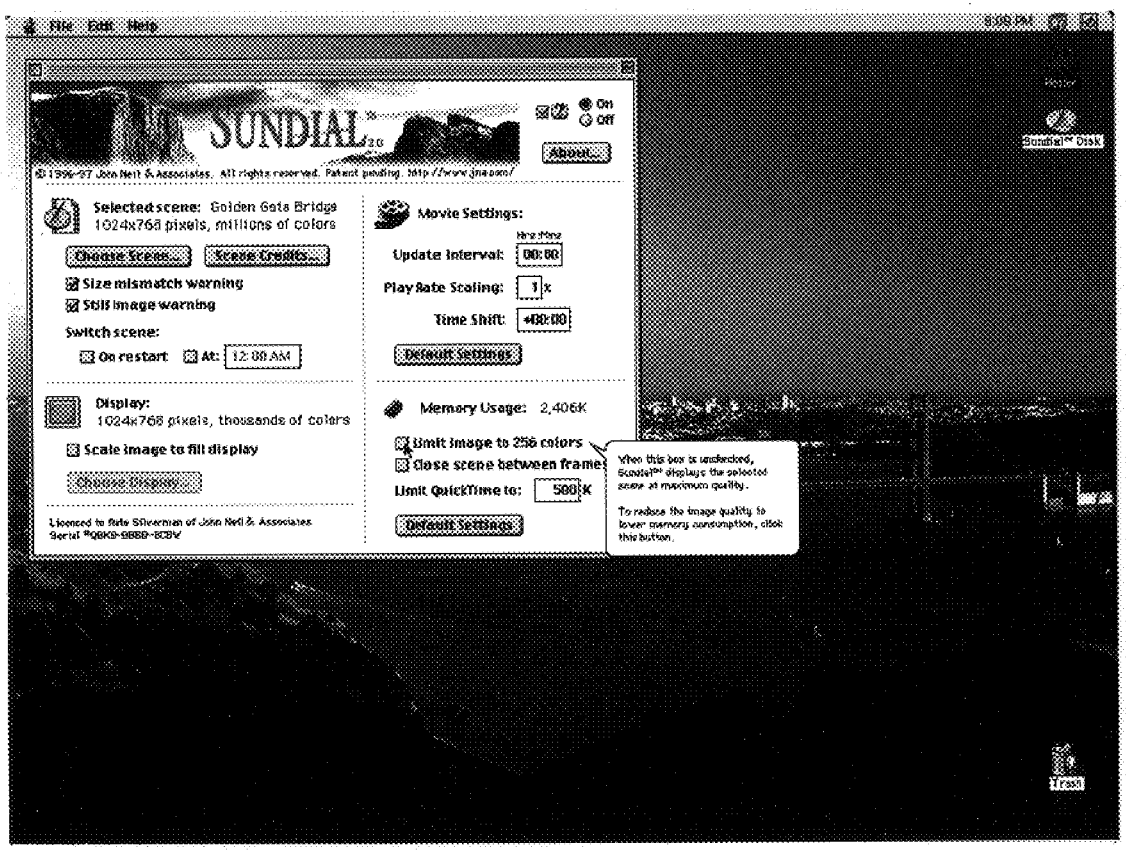
FIG._3H

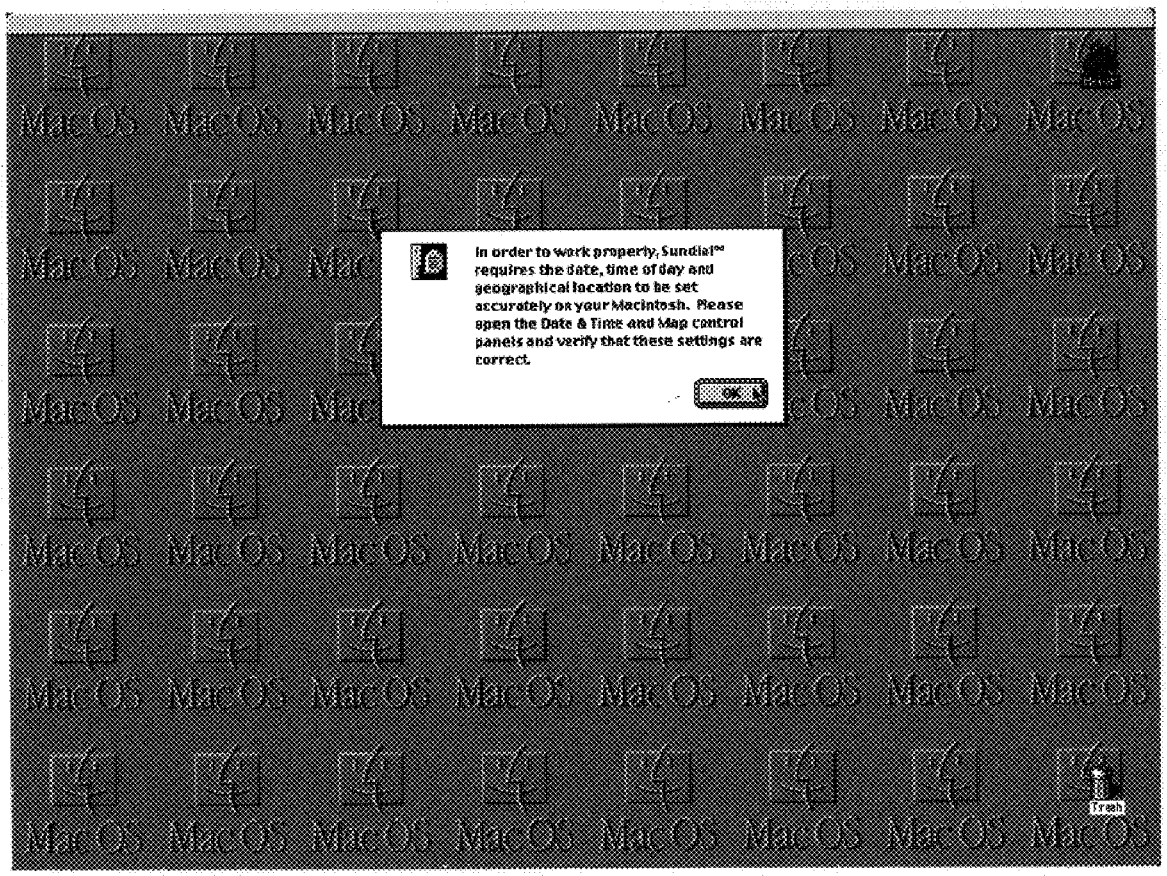
FIG._31

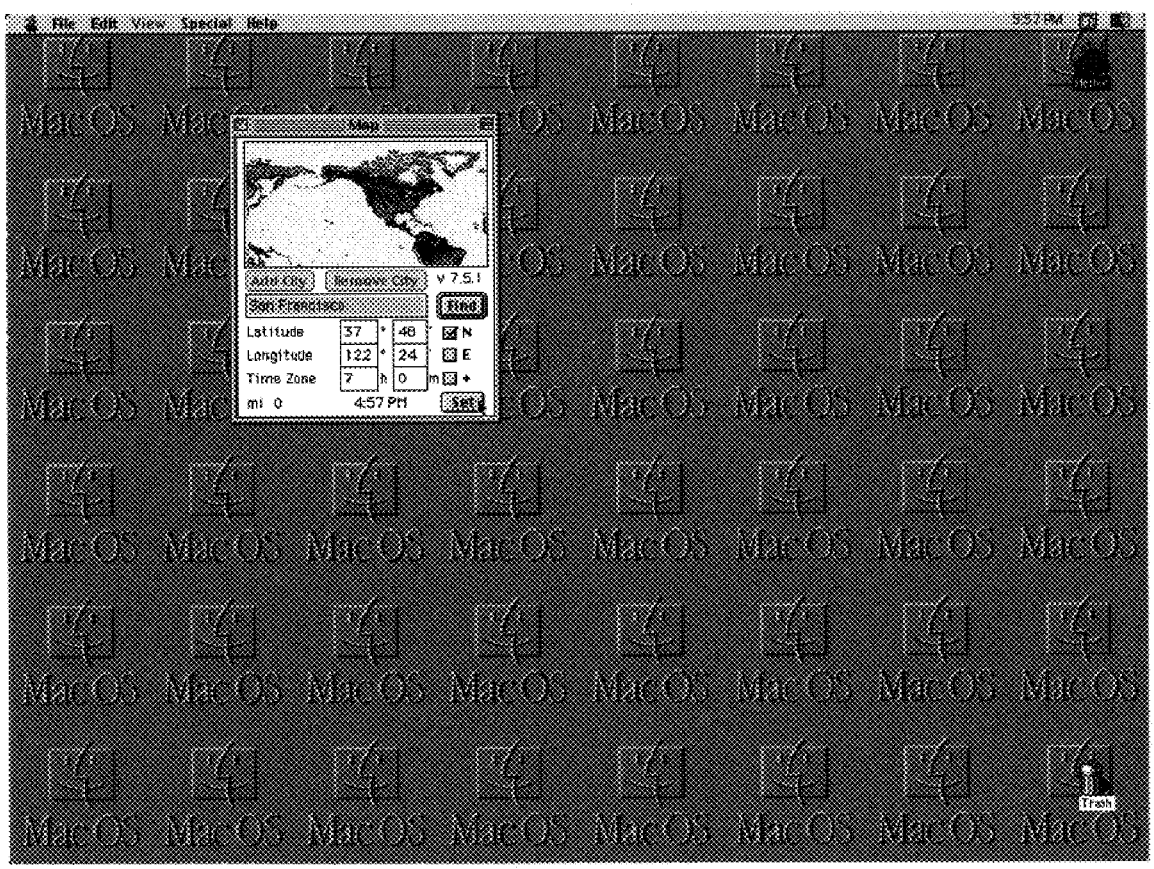
FIG._3J

FIG._4A

FIG._4B

FIG._4C

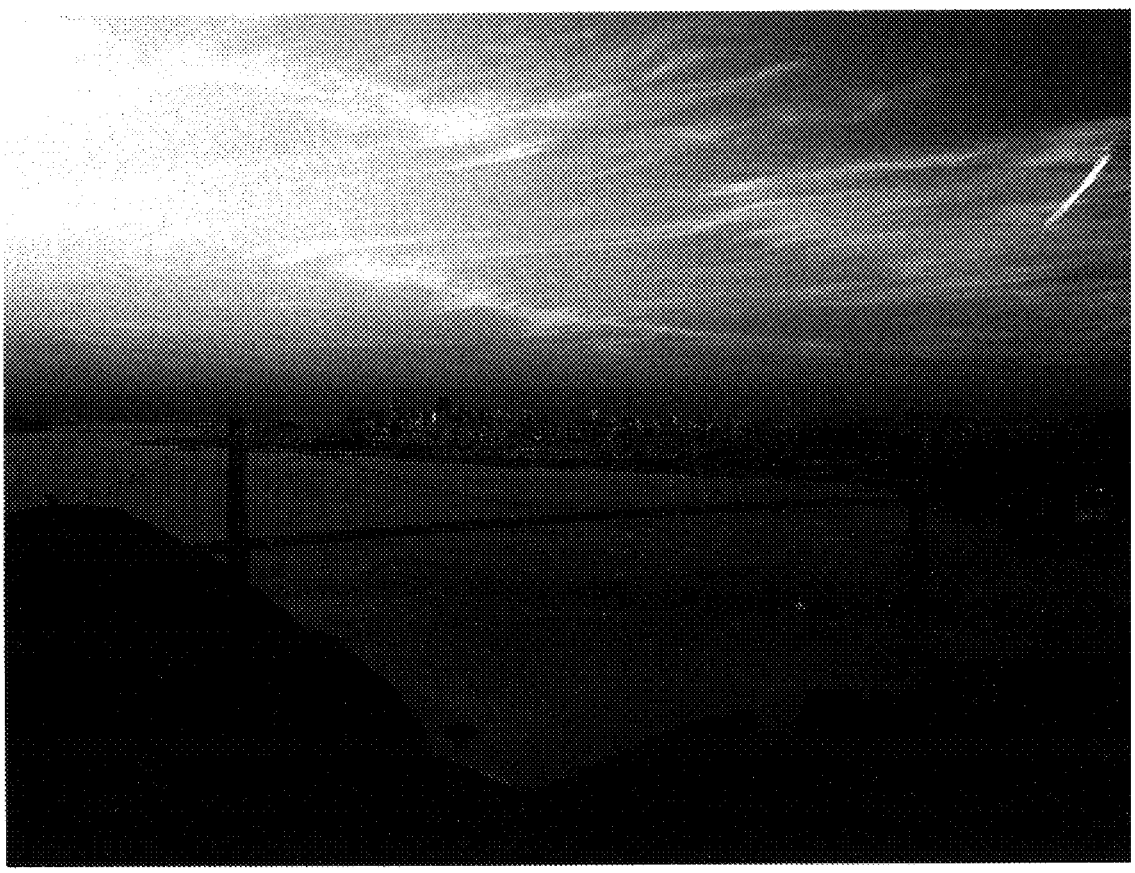
FIG._4D

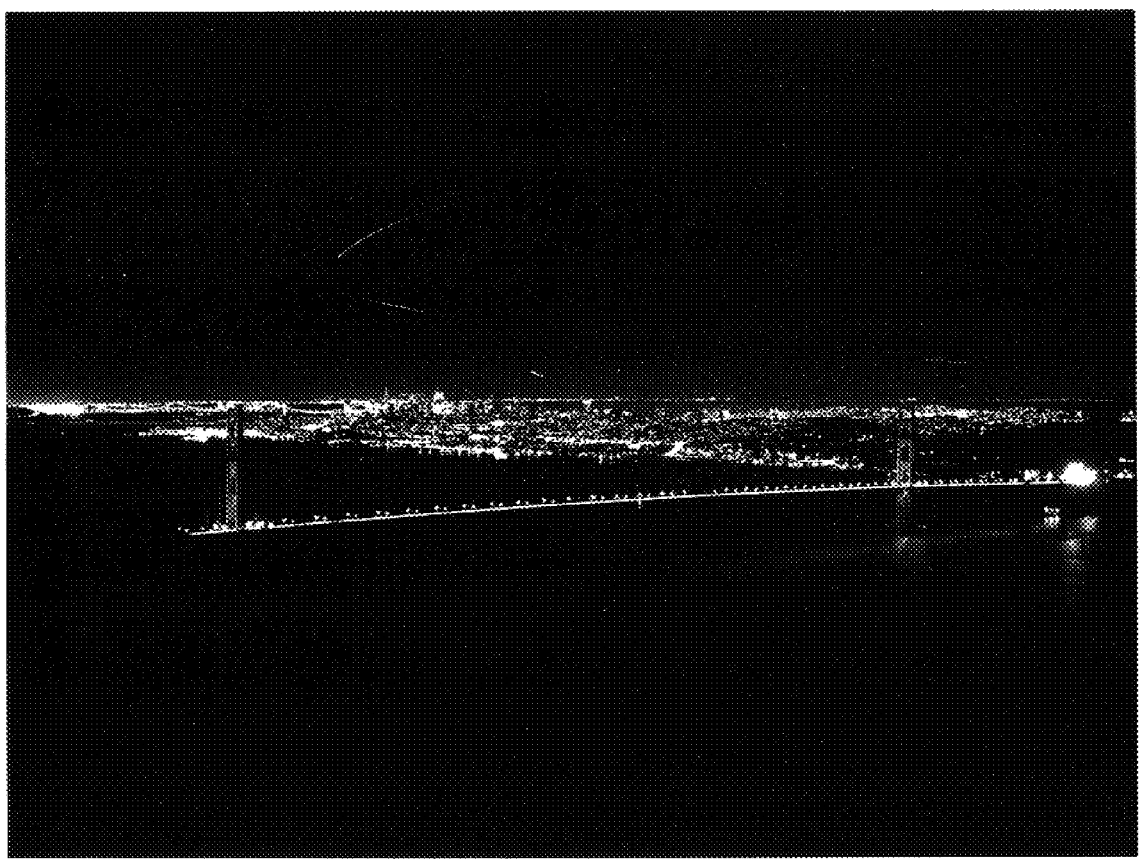
FIG._4E

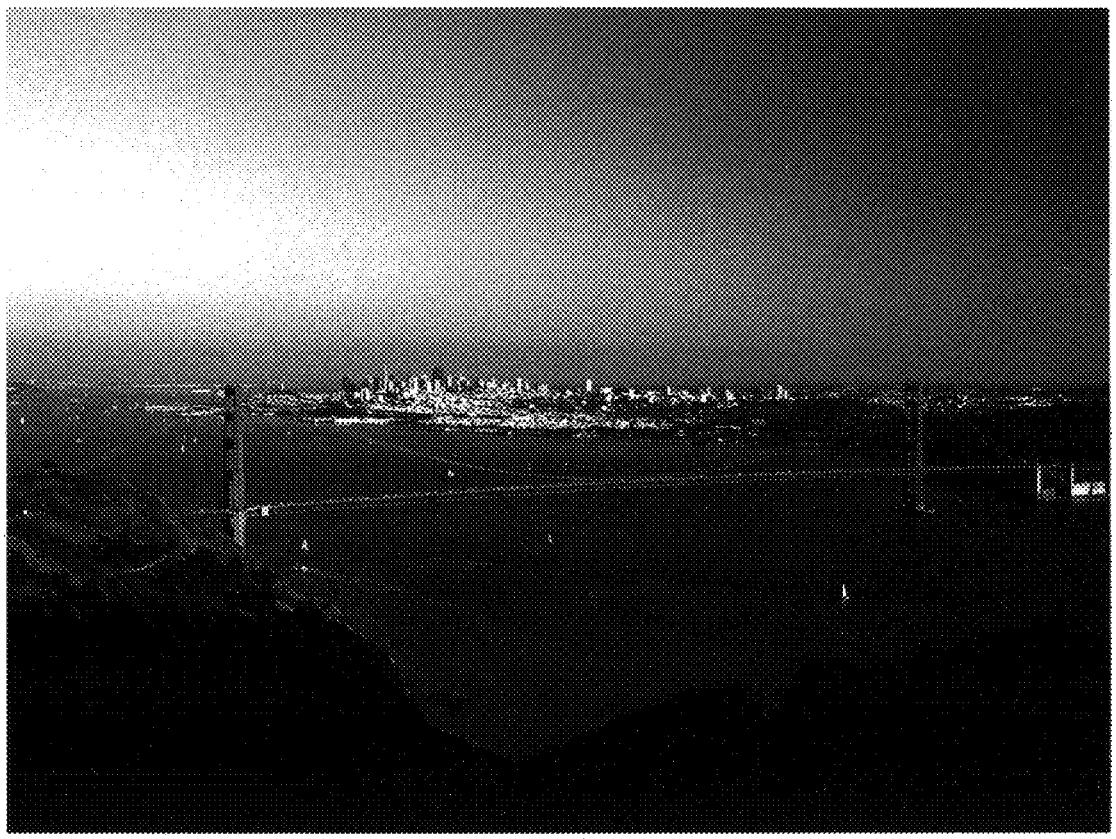
FIG._4F

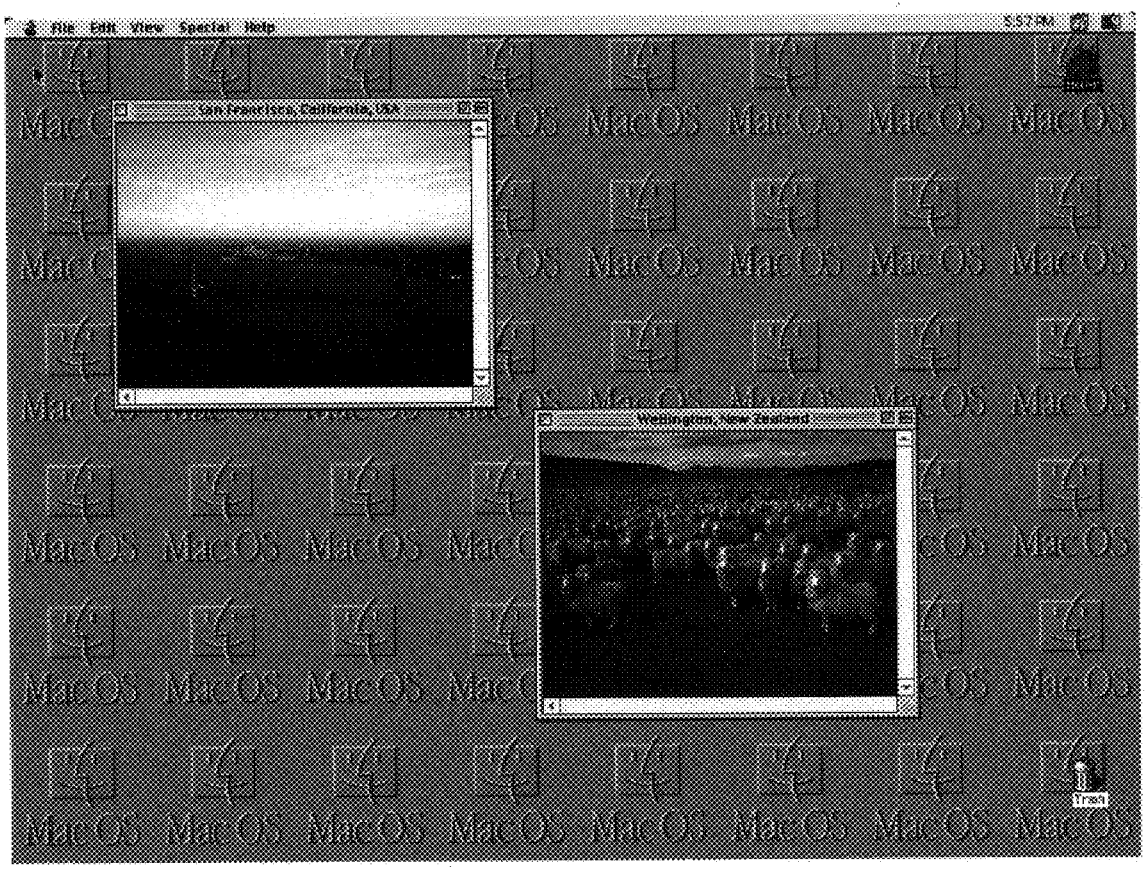
FIG._5

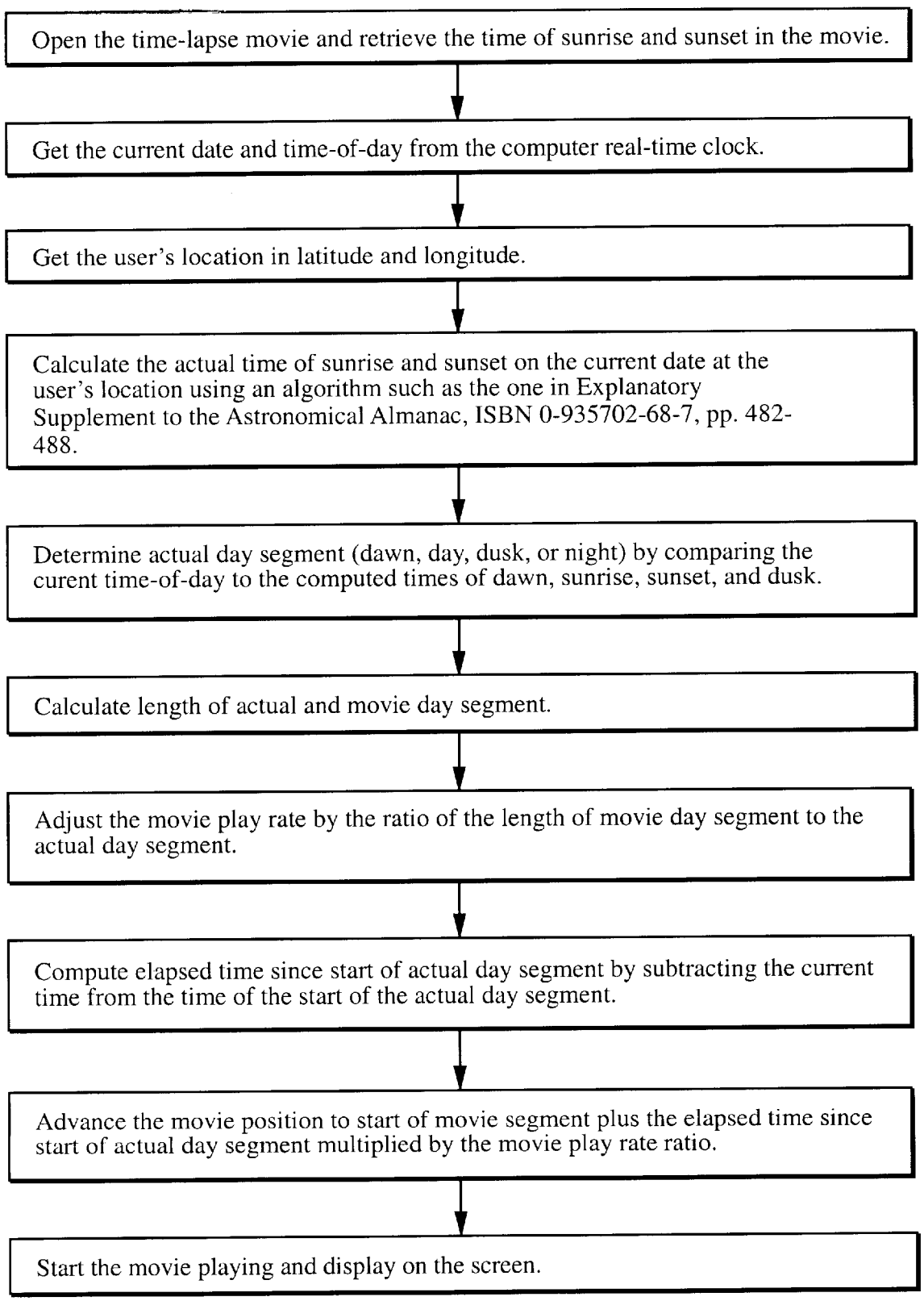
FIG._6

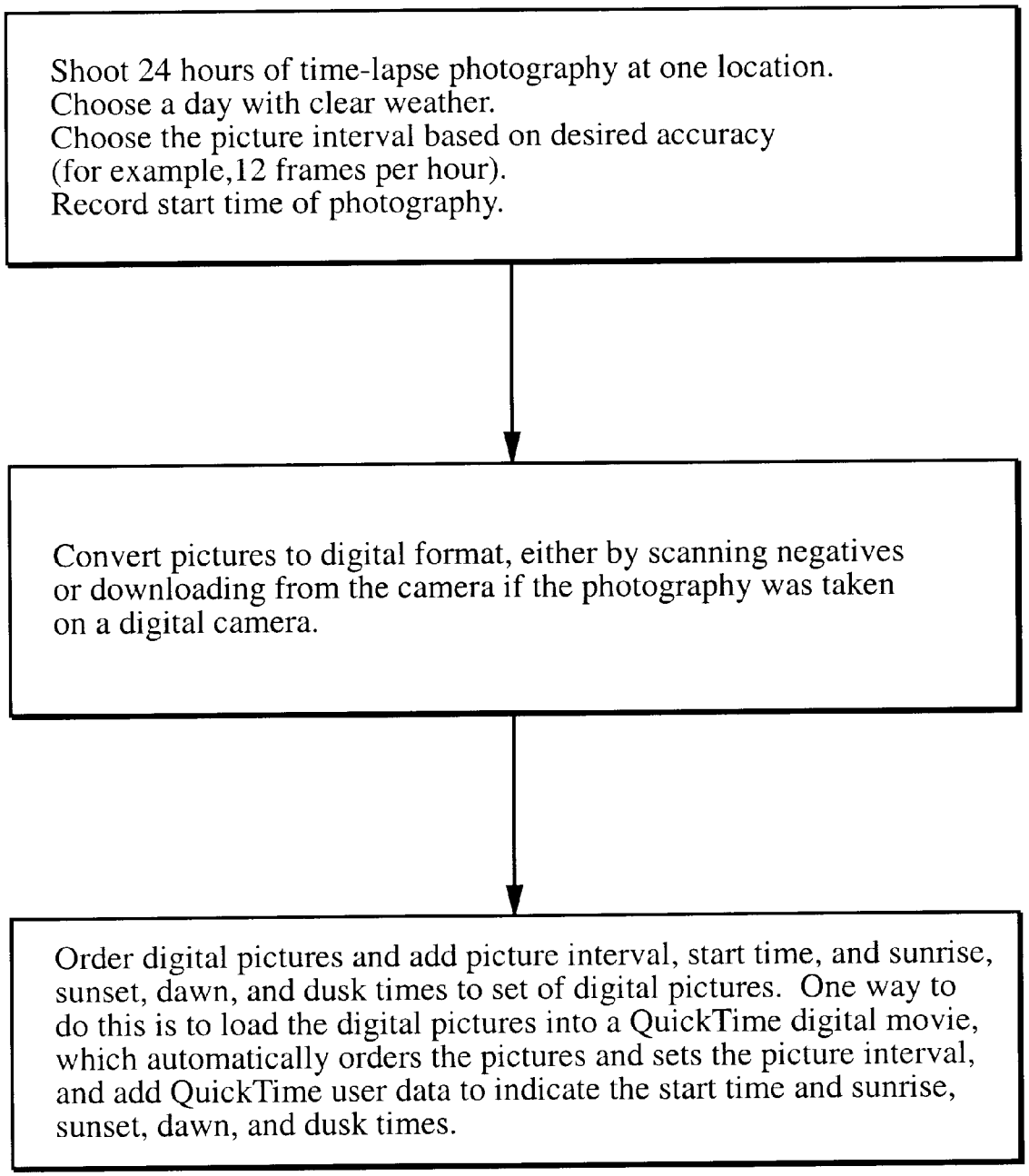
FIG._7

PICTORIAL USER INTERFACE FOR ESTABLISHING TIME OF DAY AND GEOGRAPHICAL OR ENVIRONMENTAL CONTEXT ON A COMPUTER DISPLAY OR OTHER MONITOR

CROSS-REFERENCE TO RELATED APPLICATION

This patent application is based on a provisional patent application of John M. Neil, U.S. provisional patent application Series Code/Ser. No. 60/026,477, filed on Sep. 20, 1996, entitled "PICTORIAL USER INTERFACE FOR ESTABLISHING TIME OF DAY AND GEOGRAPHICAL CONTEXT ON A COMPUTER DISPLAY OR OTHER MONITOR."

CROSS-REFERENCE TO MICROFICHE APPENDIX

Appendix A, which is a part of the present disclosure, is a microfiche appendix consisting of four sheets of microfiche having a total of 315 frames. Microfiche Appendix A is a source code listing of a portion of the code comprising one embodiment of a system for providing a pictorial user interface for establishing time of day and geographical or environmental context on a computer display or other monitor, which is described in more detail below.

A portion of the disclosure of this patent document contains material which is subject to copyright protection. The copyright owner has no objection to the facsimile reproduction by anyone of the patent document or the patent disclosure, as they appear in the U.S. Patent and Trademark Office patent files or records, but otherwise reserves all copyright rights whatsoever.

BACKGROUND OF THE INVENTION

1. Field of the Invention

The present invention relates generally to methods and apparatus for displaying a sequence(s) of pictorial images on a video display or other monitor or in a window(s) on such a display or monitor and, more particularly, to methods and apparatus in which a pictorial user interface (hereinafter referred to as the "pictorial user interface" or "PUI") is provided to a user in a manner so that the images are synchronized with a time-of-day clock provided by the display or other monitor or a computer connected to the display or other monitor to enable the user to visualize the time of day and the time expended by viewing the evolving PUI on his or her display or other monitor, as well as the evolving PUI for others in different time zones, different geographical locations, or different environments.

2. Description of the Prior Art

Command line interfaces and graphical user interfaces are commonly used for locating and displaying text and graphical files on a computer video display. In a command line interface, such as that provided by the MS-DOS operating system by Microsoft Corporation of Redmond, Wash. or by the UNIX operating system by UXIX Systems Laboratories, Inc. and other vendors, a particular text command, such as "copy" or "delete", is entered by a user on a keyboard connected to the computer, and the results of the keyboard entry are displayed on the screen of the display. In a graphical user interface, such as that provided by the WINDOWS operating system by Microsoft or the MACINTOSH operating system by Apple Computer, Inc. of Cupertino, Calif., a graphical display with windows, scroll boxes, pull-down menus, and icons is provided for user manipulation by use of a keyboard and pointing device (called a "mouse") similarly connected to a computer and a video display.

Recognizing the fact that computer users are not always executing commands or otherwise manipulating their displays, a number of vendors have introduced static screen displays called "screensavers" which display one or more textual, graphical, and pictorial images after detecting user interactivity over a period of time. Some commercial screensavers provide static pictorial images solely for ornamental purposes. Most commercial screensavers to date provide simple textual or graphical images to act as a security lock over the display. More recent commercial screensavers have provided animation of text, graphics, and other audiovisual materials. These screensavers provide no indication of the time of day or meaningful indication of the passage of time.

Other software packages available from various computer software vendors provide options for selecting the background or "wallpaper" for the command interface. These backgrounds also provide no indication of the time of day.

The prior art evidences three approaches to provide a visual indication of time of day or the passage of time. The traditional approach is to simply display the time as numeric indicia in either standard (AM/PM) or military 24-hour format at a given location on the video display or monitor. The other known approaches are a) live web cams and b) animated clocks.

Live web cams, for example, "surf cams" at http://www.surflink.com/, provide a real-time view of the outdoors, which may provide an indication of the approximate time of day to the user; that is, the evolving scene may be interpreted as a general indication of the time of day and the passage of time. However, this approach has the disadvantage that an external connection to provide a live feed is required. Furthermore, the time-of-day indication is accurate only if the web cam is located in the same time zone, as well as in the same geographical vicinity, as the user.

Animated clocks include: "XEarth", which draws an animated picture of the rotating Earth on the video display; "Seize the Day", which animates a single static image to reflect the time of day; as well as "World Watch", which is a typical world clock depicted as a pattern of sunlight moving across a map of the earth. These animated clocks provide the user with a general indication of the time of day but require the computer to produce animated images on the fly. Since animation requires the computer to generate the displayed images, the images are necessarily relatively crude, and, consequently, the displayed images are typically neither aesthetic nor particularly realistic.

It would be desirable to provide a process and integrated system for retrieving and displaying a series of pictorial images comprising a pictorial user interface in a manner which is synchronized with the time-of-day clock provided by the computer or display or other monitor and which changes the displayed portion of the pictorial image in a manner that allows the user to visualize on his or her display the time of day and the time expended for the geographical location or environment of the user, as well as for the geographical location or environment of one or more other users of computers who are located in one or more different time zones or different geographical locations or environments.

SUMMARY OF THE INVENTION

The present invention comprises a method for retrieving and displaying a pictorial user interface (PUI) on a computer display or other monitor. The PUI is composed of a sequence of related time-lapse pictorial images that are displayed, over time, under software control, such that the time of day and changes thereof can be visualized both for the geographical location or environment of the user, as well as for the geographical location or environment of another person, such as a party telephoning the user from a different geographical location or environment and/or in a different time zone. The PUI can display any series of pictorial images for any geographical location or environment and for any time zone. Apparatus is also provided for performing the method.

It is a general object of the present invention to provide a method and apparatus to retrieve and to present a pictorial user interface on a computer display or other monitor.

It is another object of the present invention to provide such a method and apparatus for full-screen display or display in a scaled fashion in one or more windows sized by the user on a computer display or other monitor.

It is further object of the present invention to provide such a method and apparatus under software control synchronized with a time-of-day clock provided by the computer, display, or other monitor for automatic presentation of the pictorial images in a manner that allows the user to visualize the time of day and the time expended for himself or herself, as well as for another in a different time zone or different geographical location or environment.

It is a further object of the present invention to provide an automated approach for calculating and presenting the actual time of sunrise and sunset, and preferably dawn and dusk, based on the current date and the selected geographical location of the user based on latitude and longitude of that geographical location and automatic adjustment of the presentation of the sequence of pictorial images so that sunrise and sunset, and preferably dawn and dusk, occur virtually on the user's display or other monitor in the same manner in which they occur in real time, in the user's selected geographical location having such latitude and longitude.

Unlike the known prior art, the pictorial user interface in accordance with the invention does not require any connection to the Internet or other external source of images. Also, the pictorial user interface provides time-lapse photographic images, instead of animation, and synchronizes the display of images to the time of day provided by the real-time clock of the computer video display or other monitor. The pictorial user interface synchronizes the display of pictorial images to actual times of sunrise and sunset, and preferably to actual times of dawn and dusk as well, to provide a more realistic pictorial user interface. The real-time clock may also provide a date, and the pictorial user interface also preferably automatically adjusts the daylight period for seasonal changes at the user's geographical location to account for the varying period of daylight due to the seasons of the year.

The foregoing and other objects, features, and advantages of the present invention will become more readily apparent from the following detailed description of a preferred embodiment which proceeds with reference to the accompanying drawings.

BRIEF DESCRIPTION OF THE DRAWINGS

FIG. 1 illustrates one embodiment of an integrated system for providing the pictorial user interface in accordance with the present invention that establishes time of day and geographical or environmental context on a computer display or other monitor;

FIG. 2 shows a typical graphical user interface displayed on a computer video display before the pictorial user interface provided by the present invention is implemented on that same display;

FIGS. 3A through 3J, shows the dialog provided by the pictorial user interface of the present invention to the user for user selection of the time of day and geographical location for presentation in the pictorial user interface;

FIGS. 4A through 4F, illustrates start, dawn, sunrise, sunset, dusk, and last pictorial image frames for one scene for the pictorial user interface of the present invention in full-screen display mode under software control, which updates the pictorial display, in five-minute increments over a 24-hour day, in a manner that allows the user to visualize the time of day and the time expended in five-minute increments based on the evolving pictorial user interface;

FIG. 5 illustrates the pictorial user interface of the present invention in multiple windowing display mode under software control, which updates the pictorial display, in a manner which allows the user to visualize the time of day, time expended, and geographical location or environment for the user, as well as the time of day, time expended, and geographical location or environment of another;

FIG. 6 is a flow diagram of the software control of the present invention; and

FIG. 7 is a block diagram of database construction for the sequence of pictorial images comprising a geographical location or environment for use by the software control of the present invention.

BRIEF DESCRIPTION OF THE TABLES

TABLE 1 lists samples of user-selectable geographical locations for the pictorial user interface of one embodiment of the present invention; and TABLE 2 lists samples of user-selectable time increments for controlling timing for updating the pictorial user interface of the present invention.

DETAILED DESCRIPTION OF THE PREFERRED EMBODIMENT

The pictorial user interface provided by one embodiment of the present invention can be used to establish time of day and geographical context or environment on a computer video display or other monitor. One preferred embodiment provides such a pictorial user interface for a personal computer. For example, the pictorial user interface in accordance with one preferred embodiment of the present invention can be used on MACINTOSH personal computers, including POWER MACINTOSH and the 680x0 family of MACINTOSH personal computers commercially available from Apple Computer, Inc. of Cupertino, Calif.

One preferred embodiment of the pictorial user interface in accordance with the present invention will now be described in detail. The preferred embodiment to be described is a software application, written in the "C" programming language, comprised of a collection of computer programs and subroutines configured to execute on a MACINTOSH personal computer.

As shown generally in FIG. 1, the numeral 1 represents the system of the present invention comprising the software application operating on a personal computer 2. For example, the personal computer 2 may be any MACINTOSH personal computer, operating system 7.0 or greater, having at least eight megabytes of random access memory (RAM) and at least a 40-megabyte hard disk drive with a CD-ROM drive 9 and preferably a color monitor 4. The pictorial user interface of the present invention is preferably displayed on the monitor 4, such as a 15" color monitor (640×480 resolution) together with a 256 or more color graphics video card installed in the personal computer 2. As shown in FIG. 1, the system 1 of the present invention for displaying the pictorial user interface also preferably comprises a mouse 6 and a keyboard 8.

Generally, pictorial images in the form of a sequence of scanned, digitally encoded time-lapse photographs of a scene(s) are stored on a CD-ROM readable by the CD-ROM drive 9. "QuickTime" software by Apple Computer accesses the pictorial images which are stored as a digital movie(s) in high-quality 24-bit color in three different resolutions. For example, the resolutions may be 640×480 which is optimally adapted for display on the 15" monitor 4, as well as 832×624 and 1024×768 resolutions for maximum display quality on different standard sizes of monitors. The "QuickTime" software produces digital movies in the form of a sequence of pictorial images which are displayed on the monitor 4. For example, the digital movies may sequentially display a new pictorial image of the sequence every five minutes over a 24-hour period. The transition between pictorial images is smooth and virtually instantaneous.

Considered in more detail, the "QuickTime" software is employed to store the set of scanned, digitally encoded time-lapse photographic images for the scenes that can be displayed on the pictorial user interface. "QuickTime" provides the data format for the scene files. "QuickTime" is preferably employed to store the selected pictorial images for the scenes, because of the compression capability and flexibility of the "QuickTime" software. The software control in accordance with the present invention determines which frames are to be displayed and how these frames are synchronized to the actual time of day and date. That is, "QuickTime" can open and play the stored sequence of time-lapse pictorial images at a constant rate, but does not provide the synchronization to the real-time clock that is provided by the software control of the present invention. The software control in accordance with the present invention is written on top of "QuickTime" and determines all of the parameters for the digital movie and passes these to the "QuickTime" software to play the sequence of time-lapse pictorial images as a movie, and "QuickTime" does the actual drawing of scene from the "QuickTime" file.

Referring now to FIG. 2, indicated generally at 10 is a typical graphical user interface display as commercially available from Apple Computer presented on the screen 12 of the monitor 4 shown in FIG. 1 or other video display or monitor. The computer software of the present invention is programmed, in a manner which is described in more detail hereinafter, to modify this typical graphical user interface in a manner so as to produce the pictorial user interface of the invention described in more detail below.

Prior to describing the manner in which the computer software of the present invention controls the pictorial user interface, a description will first be provided of the pictorial user interface and the manner in which the preferred embodiment of the invention displays a sequence of related time-lapse pictorial images. As shown in FIGS. 3A through 3J, the system of the present invention provides the user with a dialog box 20 which enables the user to personalize the pictorial user interface.

As shown in FIG. 3A, the user may position the mouse pointer on a button labeled "Choose Scene . . . " and click the mouse 6 to initiate selection of a pictorial scene. The pictorial scene comprises at least one scene and is preferably selected from among a plurality of scenes stored in the form of sequences of scanned, digitally encoded time-lapse photographic images on the hard disk drive of the computer 2 and/or on a CD-ROM readable by the CD-ROM drive 9. When the user clicks the mouse 6 on the "Choose Scene . . . " button, a dialog box for selection of a scene appears, as shown in FIG. 3B.

Referring to FIG. 3B, the dialog box is preferably a standard "QuickTime" dialog box which enables the user to select a file (for example, the "Movie Disk" file on the hard disk drive) and display a pull-down menu which comprises a list of titles of scenes ("Coast", "Death Valley", "Farm", "Golden Gate Bridge", "Lighthouse", "Marina", "Mt. Shasta", etc.) from which a scene may be selected. The user selects a scene by positioning the mouse pointer on the title of a scene and clicking the mouse 6. When the user positions the mouse pointer on the title for the scene and clicks the mouse 6, the title of the scene is highlighted, as shown in FIG. 3B.

The "QuickTime" dialog box shown in FIG. 3B also preferably comprises a check box labeled "Show Preview", which can be toggled on and off by positioning the mouse pointer on the "Show Preview" check box and clicking the mouse 6. If the "Show Preview" box is selected, as shown in FIG. 3B, the sequence of scanned, digitally encoded time-lapse photographic images which comprise the highlighted scene is accessed by the "QuickTime" software and played as a digital movie in the "Preview" window at the left of the pull-down menu which displays the list of scenes in the "QuickTime" dialog box shown in FIG. 3B. Preferably, the scene is stored as a second track with a small image size that can be played back in the small "Preview" window at a high frame rate. The selection of the "Show Preview" check box enables the user to preview the tentatively selected scene at a high frame rate. The rate at which the preview is played is at a higher rate than the sequence of time-lapse pictorial images is to be displayed on the pictorial user interface, for example, the preview rate is on the order of 24 frames a second. The purpose of the relatively high frame rate is to enable the user to visualize in a short period of time how the highlighted scene will evolve on the screen 12 of the monitor 4 if the highlighted scene is selected.

The tentatively selected scene highlighted in the list of scenes is selected for the pictorial user interface by positioning the mouse pointer on the "Open" button shown in FIG. 3B and clicking the mouse 6. For example, the scene which is highlighted in the list of scenes shown in FIG. 3B is "Golden Gate Bridge". Consequently, if the user clicks the mouse 6 on the "Open" button, the pictorial user interface is personalized to display a scene of the Golden Gate Bridge, as shown in FIG. 3C.

When the scene has been selected, the pictorial user interface is activated, as indicated by the "On" button in the upper right hand corner of the dialog box 20 shown in FIG. 3A. Also, the software control of the present invention automatically reads the real-time clock of the computer 2 and synchronizes the display of the sequence of time-lapse pictorial images for the selected scene to the actual time provided by the real-time clock. For example, if the real-time clock indicates that the time is 5:30 PM, the sequence of time-lapse pictorial images is scanned beginning with a start frame until the image most closely approximating the image corresponding to 5:30 PM is located. The start frame corresponds to the first time-lapse photograph, that is, when the photographer started the sequence of time-lapse photographic images. This corresponds to frame one of the digital movie stored on the hard disk drive or CD-ROM.

The image most closely approximating the image corresponding to the current time provided by the real-time clock is then accessed by the "QuickTime" software and displayed on the screen 12 of the monitor 4 to produce the image shown in FIG. 3C. As shown in FIG. 3A, the software control in accordance with the present invention also provides the user with the option to have the selected scene displayed on the pictorial user interface change "On restart" of the computer 2 or at a time entered by the user using the keyboard 8 ("At hh:mm"). The software control can be programmed to change the scene randomly, alphabetically by title, or in any other manner. The user can disable the pictorial user interface by positioning the mouse pointer on the "Off" button shown in the upper right hand corner of FIG. 3A and clicking the mouse 6.

As also shown in FIG. 3A, the dialog box 20 comprises a section which is designated "Movie Settings:". This section includes a box labeled "Time Shift:". The user can enter a numeric value in the format "+hh:mm" using the keyboard 8 to provide an offset which the software control of the present invention uses to adjust the pictorial user interface from synchronization of the sequence of time-lapse pictorial images with the real-time clock to a different time. For example, the user may work at night but nevertheless may desire to personalize the pictorial user interface to provide a daylight scene. Accordingly, the user may enter an offset of "+12:00" in the "Time Shift:" box to display the sequence of pictorial images in a different time reference. This also enables the user to synchronize the display to the time in a different time zone. As shown in FIG. 3A, the user may also adjust the "Update Interval:" or "Play Rate Scaling:" to slow down the rate at which the pictorial user interface is updated or speed up the playback rate of the time-lapse pictorial images comprising the scene, respectively. If the "Update Interval:" is slowed down so that the pictorial user interface is updated slower than the nominal interval between the time-lapse pictorial images of the sequence, the realism of the pictorial user interface is diminished, but the pictorial images remain synchronized to the actual time provided by the real-time clock. On the other hand, if the "Playback Rate Scaling:" is increased to more than "1×", the pictorial user interface will be updated more frequently than the nominal interval between time-lapse pictorial images in the sequence, and synchronization with the actual time provided by the real-time clock is lost. The preferred "Default Settings" are shown in FIG. 3A, and the user can return to these default settings at any time by positioning the mouse pointer on the "Default Settings" button and clicking the mouse 6.

As shown in FIG. 3A, the dialog box 20 includes a button labeled "Scene Credits . . . ". If the user elects to position the mouse pointer on the "Scene Credits . . . " button and click the mouse 6, a dialog box appears, as shown in FIG. 3D. This dialog box provides screen credit information about the scene that has been selected by the user for display as the pictorial user interface, including, for example, the photographer, the graphic artist who enhanced the images, etc.

The dialog box 20 also includes a section which indicates the resolution for the pictorial image being displayed, for example, "1024×768 pixels, millions of colors", as shown in FIG. 3A. This resolution corresponds to the resolution of the scene selected from the listed scenes shown in FIG. 3B. As indicated above, the time-lapse pictorial images are preferably provided in several resolutions for maximum display quality on different standard sizes of monitors.

If the selected image resolution is different from the optimal resolution as determined by the software control of the present invention, the user can select to "Scale image to fill display", as shown in the lower left portion of FIG. 3A.

Accordingly, the time-lapse pictorial images are scaled to fill the entire screen 12 of the monitor 4, as shown in FIG. 3C. Alternatively, the user can toggle "Scale image to fill display" to off. In this case, the time-lapse pictorial image is not scaled to fill the entire screen 12 of the monitor 4, as shown in FIG. 3E. If the user does not possess a standard size monitor 4, he or she may prefer to display a slightly smaller image at high quality, rather than have the software control in accordance with the present invention enlarge the image to fill the screen 12 of the monitor 4 and sacrifice image quality.

As shown in FIG. 3A, the dialog box 20 also includes a "Choose Display . . . " button. This button is provided to implement the feature of the MACINTOSH personal computer, operating system 7.0 or greater, that enables the user to use two monitors on his or her desktop. When the user selects "Choose Display . . . ", a dialog box appears, as shown in FIG. 3F. As indicated in the dialog box shown in FIG. 3F, the user can position the mouse pointer on the screen of one of the two monitors on which the user desires the time-lapse pictorial images to appear and click the mouse 6 to select which monitor he or she desires to display the pictorial user interface in order to personalize his or her desktop.

The dialog box 20 also enables the user to "Limit image to 256 colors", that is, eight-bit color, as shown in FIG. 3A. In this regard, the dialog box 20 displays "Memory Usage", for example, "2,406K". To limit the memory used by the software control of the present invention, the user can position the mouse pointer on the "Limit image to 256 colors" check box and click the mouse 6. This initiates a memory saving feature used in the background; that is, the software control of the present invention implements eight-bit color depth instead of a color depth using "thousands of colors", which provides a trade-off between computer memory usage and image quality. As shown by a comparison of "Memory Usage:" in FIGS. 3A and 3G, memory usage decreases by approximately a megabyte.

As shown in FIG. 3A, the dialog box 20 also includes a check box labeled "Close scene between frames" for use when the scene that appears on the screen 12 of the monitor 4 is read from a CR-ROM by the CD-ROM drive 9. If the user positions the mouse pointer on the "Close scene between frames" check box and clicks the mouse 6, the user can remove the CD-ROM. When the update time arrives, the software control in accordance with present invention will continue to display the current pictorial image, since the CD-ROM is not available. Preferably, no error message is generated. If the time that the CD-ROM is unavailable exceeds the update interval, then the scene is not updated in synchronization with the actual passage of time. However, when the CD-ROM is re-inserted, the software control in accordance with the present invention updates the pictorial user interface so that the time-lapse pictorial image that is displayed is synchronized with the actual time provided by the real-time clock.

The software control in accordance with the present invention also provides a context-sensitive "Help" feature. As shown in FIG. 3H, the "Help" feature is enabled and uses the "Balloon Help" feature provided by the MACINTOSH operating system 7.0 or greater. Preferably, the "Help" feature is only turned on for the dialog provided by the software control of the present invention and not for other software applications that may be running simultaneously on the desktop.

The pictorial user interface in accordance with the present invention also enables the user to set the parameters of the PUI for a particular geographical location or locations to be displayed. The first time that the pictorial user interface application in accordance with the present invention is launched, a warning dialog box as shown in FIG. 3I is preferably displayed, which requests the user to set a date, time, and geographical location. The user then positions the mouse pointer on the "OK" button in the warning dialog box and clicks the mouse 6.

The software control in accordance with the present invention automatically uses the current time and date as provided by the real-time clock of the computer 2 as the default parameters for time and date. In order to set the geographical location, the user opens the "Map" control panel provided by the MACINTOSH operating system 7.0 or greater. This requires the user to position the mouse pointer on the "Map" control panel file and double click the mouse 6 to open the "Map" control panel, as shown in FIG. 3J. This enables the user to enter the name of his or her city location using the keyboard 8. The user then positions the mouse pointer on the "Find" button and clicks the mouse 6. If the entered city name is found, the location of the city blinks on the map shown in the "Map" control panel, and the user positions the mouse pointer on the "Set" button and clicks the mouse 6 to select the city location as his or her geographical location. If the entered city name is not found, the user can simply enter the "Latitude" and "Longitude" of his or her geographical location using the keyboard 8, position the mouse pointer on the "Set" button, and click the mouse 6 to enter his or her geographical location. Alternatively, the user has the option to enter a different geographical location if so desired to synchronize his or her pictorial user interface to a different time zone or geographical location. Entry of a geographical location provides an offset to Greenwich Mean Time, which is displayed in the "Time Zone" boxes, as shown in FIG. 3J. The software control in accordance with the present invention employs a conventional algorithm to calculate sunrise and sunset which uses Greenwich Mean Time and must be converted to current time for the selected geographical location.

Also, the graphical user interface of the underlying operating system is still available to the user just as the command line interface of prior art systems would also remain available to the user. Therefore, the user is able to run other applications while the pictorial user interface in accordance with the present invention is being displayed.

As shown in FIG. 4, comprised of FIGS. 4A through 4F, the pictorial user interface is preferably presented in full-screen mode under software control, which changes the pictorial display, in five-minute increments, in a manner that allows the user to visualize the time of day and the time expended. The computer software retrieves and presents a series of digital pictorial images comprising a digital movie, synchronized with the computer's or display's or other monitor's (such as a television's) time-of-day clock. When combined with the 24-hour time-lapse digital movie of a specific geographical location or environment, the computer software presents a pictorial user interface wherein the user sees an evolving scene on the user's desktop. The pictorial user interface, under software control, gives the user a general indication of the time of day and passage of time for his or her geographical location or environment, as well as the time of day and passage of time at one or more other desired geographical locations opened by the user as additional windows on the video display or other monitor, as shown in FIG. 5, as will now be described.

With the growth of digital cameras and communications between computers and other display devices by cable, modem, and other means of communication, it is now feasible for users to easily transmit to each other one or more static pictorial images that represent the particular context of time of day and geographical location or environment. A sequence of such images can be collected, stored, and transmitted as well in a form of digital movie comprising the recording of a geographical location or environment over time. Therefore, pictorial images of a remote computer user can be transmitted by telephone connection and displayed on a local user's display or other monitor during a telephone conversation between the users. Preferably, both the evolving PUI of the local user and the evolving PUI of the remote user are displayed on the display or other monitor of the local and remote users, as shown in FIG. 5.

Considered in more detail, referring to FIG. 5, the pictorial user interface is shown in multiple windowing display mode whereby the user can visualize the time of day, time expended, and geographical location for the user, as well as the time of day, time expended, and geographical location of another user as such time of day and time expended changes over time, as further shown in FIGS. 4A through 4F, except such changes are occurring in each of the multiple windows for each of the geographical locations in each of the time zones selected by the user(s) for display. In this case, multiple windows are preferably provided, rather than re-sizing the background and/or adding a window.

Referring now to FIG. 6, the computer software of the present invention engages in a series of steps to retrieve, synchronize, and present the pictorial user interface. The computer software is composed of two principal software modules: a player software module, which retrieves and displays the digital movie on the desktop of the user-selected display or other monitor, and a controller software module, which controls the player. The player software module runs continuously and invisibly in the background from system start-up. The player software module and the controller software module are both disclosed in full "C" source code form in microfiche Appendix A hereto.

The player software module retrieves and presents a variable frame-rate digital movie both in full-screen mode on the display or other monitor behind all windows, menu bars, desktop icons, and other elements of a graphical user interface or in windowing mode in multiple windows on the display or other monitor. The player software consumes a relatively unnoticeable amount of central processing unit (CPU) bandwidth when not drawing movie frames. Preferably, sounds associated with the digital movies may be played, or, alternatively, the audio may be muted. Preferably, the user may also select whether to demarcate a particular time interval by a particular sound.

In full-screen mode, the player software displays the digital movie on the user-selected display or other monitor. The player software detects and adjusts for changes in color depth, screen size, or other attributes of the particular display or other monitor selected. Exposed desktop sections are filled in with the standard desktop pattern provided by the underlying operating system software. The player software preferably does not override any screensaver application that may be running. Update of pictorial images without being displayed may continue or not continue depending on the particular screensaver that may be running. Preferably, however, synchronization of images with the real-time clock is not lost do to operation of screensaver software.

In multiple windowing display mode, the player software assures that the windows are re-sizable and that digital movies are scaled to fit the window size and maintain, to the extent feasible, the original aspect ratio for the digital movie. The multiple windows remember their size and position between system restarts.

The controller software module is launched to adjust settings or to change the digital movie, as shown in FIGS. 3A through 3J, such as by changing the geographical location or environment or selecting a digital movie provided by communications transfer from another user. Examples of different sample related pictorial images comprising digital movies which can be used with the player software are shown in the following TABLE 1:

TABLE 1

| Geographical Location | Greenwich Time Offset | Description of Pictorial User Interface |
|---|---|---|
| Apia, Western Samoa, USA | −11 | South Pacific Beach |
| Honolulu, Hawaii, USA | −10 | Big Wave Surfing |
| Anchorage, Alaska, USA | −9 | Eskimo Igloo |
| San Francisco, California, USA | −8 | Golden Gate Bridge |
| Flagstaff, Arizona, USA | −7 | Grand Canyon |
| Mexico City, Mexico | −6 | Mayan Temples |
| New York, USA | −5 | Statue of Liberty |
| Manaus, Brazil | −4 | Amazon River |
| Rio de Janeiro, Brazil | −3 | Carnival Festival |
| Atlantic Ocean | −2 | Ocean Scene |
| Reykjavik, Iceland | −1 | Volcanoes |
| London, England | 0 | Big Ben |
| Paris, France | 1 | Eiffel Tower |
| Cairo, Egypt | 2 | Pyramids |
| Moscow, Russia | 3 | Kremlin |
| Tehran, Iran | 4 | Q'om |
| Bombay, India | 5 | Taj Mahal |
| Katmandu, Nepal | 6 | Mt. Everest |
| Bangkok, Thailand | 7 | Ankor Wat |
| Bejing, China | 8 | Great Wall of China |
| Tokyo, Japan | 9 | Japanese Rock Garden |
| Sydney, Australia | 10 | Sydney Opera House |
| Petropavlosk, Russia | 11 | Reindeer Herd |
| Wellington, New Zealand | 12 | Sheep Farm |

The controller software communicates with the player software, and the controller software allows the user to specify the PUI by selecting the digital movie from any number of available or pre-recorded digital movies and to change options, such as the time increments between related pictorial images, and to cause the presentation of a different number of related pictorial images comprising the PUI over a 24-hour period, as shown in the following TABLE 2:

TABLE 2

| Time Increment Over 24-Hour Period | Number of Related Pictorial Images Over 24 Hour Period |
|---|---|
| Every 5 minutes | 288 |
| Every 10 minutes | 144 |
| Every 15 minutes | 96 |
| Every 20 minutes | 72 |
| Every 25 minutes | 60 |
| Every 30 minutes | 48 |
| Every 45 minutes | 36 |
| Every 60 minutes | 24 |

Referring to FIG. 7, the block diagram therein shows how digital movies can be created for recording additional geographical locations for inclusion in the library of pictorial images accessed for display as the pictorial user interface of the present invention. It should be understood that an unlimited number and type of digital movie at any number of geographical locations and in any number of different time zones can be recorded. The digital movies are marked with a start time and preferably the time of sunrise and sunset. Preferably, the digital movies are also marked with the time of dawn and dusk to provide a more realistic and aesthetic depiction of the twilight periods between dawn and sunrise and sunset and dusk, respectively, when the digital movies are played. The frames of the digital movies are preferably marked with fixed times for start, dawn, sunrise, sunset, and dusk, and the calculations made by the controller software module are used to synchronize the digital movie to the actual times for the current date.

In operation, when the user changes the digital movie, real-time clock setting, and/or geographical location, the controller software notifies the player software to start or re-synchronize the digital movie. The controller software also allows the user to preview the selected digital movie at the highest frame rate available for the given computer system and display or other monitor, as described earlier. For example, the selected digital movie can be previewed at 24 frames a second, such that the images for an entire 24-hour period are displayed to the user in a period of 12 seconds.

Optionally, when the player software is playing a digital movie that has sunrise and sunset specially marked, the controller software determines the actual time of sunrise and sunset for the current date and scales the PUI such that the digital movie playback rate displays sunrise and sunset at approximately the same time as the actual sunrise and actual sunset at the user's geographical location on that date. When the player software is playing a digital movie that has dawn, sunrise, sunset, and dusk specially marked, the controller software determines the actual time of dawn, sunrise, sunset, and dusk for the current date and scales the PUI such that the digital movie playback rate displays dawn, sunrise, sunset, and dusk at approximately the same time as the actual dawn, sunrise, sunset, and dusk at the user's geographical location on that date. The use of four synchronization points (dawn, sunrise, sunset, and dusk), instead of only two (sunrise and sunset), results in a more accurate rendition of the light level during twilight hours in the morning (between dawn and sunrise) and evening (between sunset and dusk).

It should be understood that multiple geographical locations in multiple time zones may be displayed in multiple windows and that the particular presentation of the user interface controls may vary depending on the particular implementation for a particular operating system, such as Apple MACINTOSH (as shown), Microsoft WINDOWS 3.1, Microsoft WINDOWS 95 or NT, UNIX Motif, or other graphical or command line interfaces. For example, if the user is telephoned by another in a different time zone or geographical location, the user can select a scene and enter a "Time Shift;" for the geographical location of the caller. Alternatively, if the caller is also a user, the caller may transmit information which can be used to configure the caller's window on the called user's desktop.

Although the preferred embodiment of the pictorial user interface in accordance with the present invention displays pictorial images in the form of outdoor scenes to provide geographical context for the time of day and passage of time, the pictorial images may alternatively provide environmental or other context. For example, time-lapse pictorial images of an environment, such as an indoor scene sufficient to provide an indication of the time of day and passage of time, may be provided. For example, time-lapse photographic images inside the Houston Astrodome, the New York Stock Exchange, a hospital operating room, or other scenes may provide an indication of time of day and passage of time to particular users. Also, the passage of time need not be synchronized to the period of a day. For example, the time-lapse pictorial image may be of a human fetus, and the period of time may be related to the nine-month gestational period, with an update interval of one fame a day. The real-time clock would provide the date used to update the pictorial user interface.

While a preferred embodiment for the pictorial user interface and its control system have been shown and described, it will be understood that modifications and adaptations thereof will occur to persons skilled in the art. For example, while the preferred embodiment has been described in connection with a MACINTOSH operating system, the pictorial user interface in accordance with the present invention can also be implemented on personal computer systems or servers having Microsoft WINDOWS or NT, IBM OS/2, or UNIX operating systems. "Quick-Time" software can also be used on these platforms. Alternatively, the software application/multimedia package to play the digital movie may be other than "QuickTime". For example, although "ActiveMovie" software currently only supports a certain size of movie, "ActiveMovie" can be modified to play the digital movie. Additionally, although the preferred embodiment of the pictorial user interface in accordance with the present invention provides a background for the graphic user interface, the time-lapse pictorial images could be simply provided in a window or the software control may be modified to provide a screensaver. Furthermore, the software control may be implemented to take advantage of commercially available voice recognition user interface software, such that voice commands can automatically change the pictorial user interface in the user's discretion.

Moreover, it should be apparent that the player software may be implemented to take advantage of commercially available telephone caller identification hardware and software to automatically recognize the geographical location and associated time zone for an incoming caller and to display, in multiple windowing display mode, the associated PUI for the incoming caller so as allow the user to visualize the particular time of day and geographical context of the incoming caller and the time expended during the call. When used by both the caller and the person called, the pictorial user interface provides a level of unobtrusive time management tool that has been heretofore unavailable and that can be implemented not only with personal computers but with computerized telephone devices, such as display telephones commonly found at airports, train stations, and other public facilities.

Further, it should be apparent that the pictorial user interface and associated software innovations described herein establish a new platform for third party development of digital movies or other related pictorial images, as well as related or unrelated static pictorial images, for presentation in a wide variety of diverse pictorial user interfaces.

Thus, in view of the various modifications and adaptations likely to occur to those skilled in the art, it will be appreciated that the protection afforded the present invention should not be limited except in accordance with the spirit of the claims and their equivalents. Accordingly, although the invention and its advantages have been described in detail, it should be understood that various changes, substitutions, modifications, and alterations can be made herein without departing from the spirit and scope of the invention.

What is claimed is:

1. Apparatus for providing a pictorial user interface comprising:

means for storing a predetermined sequence of digitally encoded time-lapse images indicative of the passage of time;

means for displaying each of the stored time-lapse images in the predetermined sequence;

means for providing a real-time clock signal; and means responsive to the real-time clock signal for sequentially accessing the stored time-lapse images for causing the display means to display the time-lapse images in the predetermined sequence to provide a pictorial user interface on the display means that simulates the passage of time synchronized with the real-time clock signal.

2. Apparatus according to claim 1 wherein the means for providing a real-time clock signal provides at least one of a date and a time of day.

3. Apparatus according to claim 2, further comprising means for providing actual sunrise and sunset times for a given date at a given geographical location and wherein a first time-lapse image is marked as a sunrise frame and a second time-lapse image is marked as a sunset frame and the means responsive to the real-time clock signal for sequentially accessing the stored time-lapse images for causing the display means to display the time-lapse images in the predetermined sequence to provide a pictorial user interface on the display means that simulates the passage of time synchronized with the real-time clock signal is responsive the actual sunrise and sunset times and synchronizes the sunrise frame to the actual sunrise time and the sunset frame to the actual sunset time so that the sequence of time-lapse images is displayed to provide a daylight period corresponding to the daylight period on the given date.

4. Apparatus according to claim 3, further comprising means for providing actual dawn and dusk times for the given date at a given geographical location and wherein a third time-lapse image is marked as a dawn frame and a fourth time-lapse image is marked as a dusk frame and the means responsive to the real-time clock signal for sequentially accessing the stored time-lapse images for causing the display means to display the time-lapse images in the predetermined sequence to provide a pictorial user interface on the display means that simulates the passage of time synchronized with the real-time clock signal is responsive the actual dawn and dusk times and synchronizes the dawn frame to the actual dawn time and the dusk frame to the actual dusk time so that the sequence of time-lapse images is displayed to provide a daylight period including morning and evening twilight periods corresponding to the daylight period on the given date.

5. Apparatus according to claim 1 wherein the means responsive to the real-time clock signal for sequentially accessing the stored time-lapse images for causing the display means to display the time-lapse images in the predetermined sequence to provide a pictorial user interface on the display means that simulates the passage of time synchronized with the real-time clock signal causes the time-lapse images to be displayed in a first window on the display means, and further comprising means for providing second time-lapse images wherein the means responsive to the real-time clock signal for sequentially accessing the stored time-lapse images for causing the display means to display the time-lapse images in the predetermined sequence to provide a pictorial user interface on the display means that simulates the passage of time synchronized with the real-time clock signal is also responsive to the real-time clock signal for sequentially accessing the second time-lapse images for causing the display means to display the second time-lapse images in a second window on the display means.

6. Apparatus according to claim 5 wherein the means for providing the second time-lapse images is located one of locally and remotely to the storage means.

7. Apparatus according to claim 1 wherein the digitally encoded time-lapse images are scanned time-lapse photographic images.

8. Apparatus according to claim 7 wherein the time-lapse images are images of one of a selected outdoor scene to provide geographical context and a selected other scene to provide environmental context.

9. Apparatus according to claim 7 wherein one of the time-lapse images is marked as a start frame and the means responsive to the real-time clock signal for sequentially accessing the stored time-lapse images for causing the display means to display the time-lapse images in the predetermined sequence to provide a pictorial user interface on the display means that simulates the passage of time synchronized with the real-time clock signal synchronizes to the start frame to determine where in the predetermined sequence to begin the sequence of time-lapse images to be displayed.

10. Apparatus according to claim 1 wherein the means for storing the predetermined sequence of digitally encoded time-lapse images is one of a CD-ROM and a computer hard disk.

11. Apparatus according to claim 1 wherein the means for displaying each of the stored time-lapse images in the predetermined sequence is a computer video display.

12. Apparatus according to claim 1 wherein the means for providing a real-time clock signal is a computer system clock.

13. A method for providing a pictorial user interface, comprising the steps of:

providing a predetermined sequence of digitally encoded time-lapse images indicative of the passage of time;

storing the predetermined sequence of digitally encoded time-lapse images indicative of the passage of time;

providing a means for displaying each of the stored time-lapse images in the predetermined sequence;

providing a real-time clock signal; and responding to the real-time clock signal for sequentially accessing the stored time-lapse images for causing the display means to display the time-lapse images in the predetermined sequence to provide a pictorial user interface on the display means that simulates the passage of time synchronized with the real-time clock signal.

14. The method according to claim 13 wherein the real-time clock signal provides at least one of a date and a time of day.

15. The method according to claim 14, further comprising the step of providing actual sunrise and sunset times for a given date at a given geographical location and wherein a first time-lapse image is marked as a sunrise frame and a second time-lapse image is marked as a sunset frame and the step of responding to the real-time clock signal for sequentially accessing the stored time-lapse images for causing the display means to display the time-lapse images in the predetermined sequence to provide a pictorial user interface on the display means that simulates the passage of time synchronized with the real-time clock signal responds to the actual sunrise and sunset times and synchronizes the sunrise frame to the actual sunrise time and the sunset frame to the actual sunset time so that the sequence of time-lapse images is displayed to provide a daylight period corresponding to the daylight period on the given date.

16. The method according to claim 15, further comprising the step of providing actual dawn and dusk times for the given date at a given geographical location and wherein a third time-lapse image is marked as a dawn frame and a fourth time-lapse image is marked as a dusk frame and the step of responding to the real-time clock signal for sequentially accessing the stored time-lapse images for causing the display means to display the time-lapse images in the predetermined sequence to provide a pictorial user interface on the display means that simulates the passage of time synchronized with the real-time clock signal responds to the actual dawn and dusk times and synchronizes the dawn frame to the actual dawn time and the dusk frame to the actual dusk time so that the sequence of time-lapse images is displayed to provide a daylight period including morning and evening twilight periods corresponding to the daylight period on the given date.

17. The method according to claim 16, further comprising the step of selecting the given geographical location.

18. The method according to claim 15, further comprising the step of selecting the given geographical location.

19. The method according to claim 13 wherein the digitally encoded time-lapse images are scanned time-lapse photographic images.

20. The method according to claim 19 wherein the time-lapse images are images of one of a selected outdoor scene to provide geographical context and a selected other scene to provide environmental context.

21. The method according to claim 19 wherein one of the time-lapse images is marked as a start frame and the step of responding to the real-time clock signal for sequentially accessing the stored time-lapse images for causing the display means to display the time-lapse images in the predetermined sequence to provide a pictorial user interface on the display means that simulates the passage of time synchronized with the real-time clock signal is synchronized to the start frame to determine where in the predetermined sequence to begin the sequence of time-lapse images to be displayed.

22. The method according to claim 13, further comprising the steps of providing means for selection of a predetermined sequence of digitally encoded time-lapse images indicative of the passage of time and selecting the predetermined sequence to be displayed.

23. The method according to claim 22, further comprising the step of previewing the selected predetermined sequence.

24. The method according to claim 22 wherein the selected predetermined sequence is automatically changed upon the occurrence of one of each start-up of the display means and at a given time of day.

25. The method according to claim 13 wherein the step of storing the predetermined sequence of digitally encoded time-lapse images comprises the steps of providing one of a CD-ROM and a computer hard disk and storing the predetermined sequence of digitally encoded time-lapse images on the one of the CD-ROM and the computer hard disk.

26. The method according to claim 13 wherein the means for displaying each of the stored time-lapse images in the predetermined sequence is a computer video display.

27. The method according to claim 13 wherein the step of providing a real-time clock signal comprises the steps of providing a computer system clock and generating the real-time clock signal using the computer system clock.

* * * * *